(12) United States Patent
Sagawa et al.

(10) Patent No.: US 8,506,701 B2
(45) Date of Patent: Aug. 13, 2013

(54) METHOD FOR PRODUCING HYDRAULIC POWDER

(75) Inventors: Keiichiro Sagawa, Wakayama (JP); Masaaki Shimoda, Wakayama (JP); Koji Nagasawa, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/810,216

(22) PCT Filed: Jul. 14, 2011

(86) PCT No.: PCT/JP2011/066066
§ 371 (c)(1),
(2), (4) Date: Jan. 15, 2013

(87) PCT Pub. No.: WO2012/008517
PCT Pub. Date: Jan. 19, 2012

(65) Prior Publication Data
US 2013/0112113 A1    May 9, 2013

(30) Foreign Application Priority Data
Jul. 16, 2010    (JP) ................................. 2010-161561

(51) Int. Cl.
*C04B 7/52*    (2006.01)
*C04B 103/52*    (2006.01)

(52) U.S. Cl.
USPC ........... 106/808; 106/693; 106/696; 106/727; 106/757

(58) Field of Classification Search
USPC .......................... 106/693, 696, 727, 757, 808
See application file for complete search history.

(56) References Cited

U.S. PATENT DOCUMENTS

| 2,203,809 A | 6/1940 | Bechtold |
| 3,615,785 A | 10/1971 | Moorer et al. |
| 4,943,323 A | 7/1990 | Gartner et al. |
| 4,990,190 A | 2/1991 | Myers et al. |
| 5,017,234 A | 5/1991 | Gartner et al. |
| 5,084,103 A | 1/1992 | Myers et al. |
| 5,429,675 A | 7/1995 | Cheung et al. |
| 7,160,384 B2 | 1/2007 | Jardine |
| 7,285,599 B2 | 10/2007 | Mertens et al. |
| 7,572,854 B2 | 8/2009 | Schneider et al. |
| 2009/0050023 A1 | 2/2009 | Buerge et al. |
| 2010/0319587 A1 | 12/2010 | Shimoda et al. |
| 2011/0005432 A1 | 1/2011 | Shimoda et al. |

FOREIGN PATENT DOCUMENTS

| JP | 48-42697 B | 12/1973 |
| JP | 3-183647 A | 8/1991 |
| JP | 5-147984 A | 6/1993 |
| JP | 10-504514 A | 5/1998 |
| JP | 2865149 B2 | 3/1999 |
| JP | 2000-313648 A | 11/2000 |
| JP | 2002-145651 A | 5/2002 |
| JP | 2006-515826 A | 6/2006 |
| JP | 2009-62262 A | 3/2009 |
| WO | WO 96/06055 A1 | 2/1996 |
| WO | WO 02/22717 A1 | 3/2002 |
| WO | WO 2004/033386 A1 | 4/2004 |
| WO | WO 2009/022716 A1 | 2/2009 |
| WO | WO 2009/118652 A1 | 10/2009 |

OTHER PUBLICATIONS

Computer-Generated Translation for JP-2000-313648-A, published Nov. 14, 2000.
International Preliminary Report on Patentability for International Patent Application No. PCT/JP2011/066066, dated Feb. 12, 2013.
International Search Report issued in PCT/JP2011/066066, mailed on Oct. 18, 2011.
Written Opinion of the International Searching Authority issued in PCT/JP2011/066066, mailed on Oct. 18, 2011.

*Primary Examiner* — Anthony J Green
(74) *Attorney, Agent, or Firm* — Birch, Stewart, Kolasch & Birch, LLP

(57) ABSTRACT

The present invention provides the production of the hydraulic powder containing $C_3A$ in an amount of 0.5 to 9.5% by weight through a step of grinding a hydraulic compound in the presence of the alkanolamine having a freezing point of not higher than 0° C.

20 Claims, No Drawings

METHOD FOR PRODUCING HYDRAULIC POWDER

FIELD OF THE INVENTION

The present invention relates to a method for producing a hydraulic powder from a hydraulic compound by grinding the compound.

BACKGROUND OF THE INVENTION

Various hydraulic powders are produced from hydraulic compounds such as Portland cement clinker and blast furnace slag by grinding these compounds. For example, a Portland cement is produced by firing raw materials containing limestone, clay, and iron slag to obtain a clinker, mixing the clinker with an appropriate amount of gypsum, and grinding the mixture. In the production, to increase a grinding efficiency, grinding aids such as diethylene glycol and triethanolamine are used. In the step of grinding, a hydraulic compound is desirably ground to an intended size as efficiently as possible. For this purpose, a grinding aid has conventionally been used in the step of grinding.

JP-A 05-147984 discloses a method for producing a high strength cement, in which a granulated material of superfine particles that is easy to handle is used in order to achieve sufficient effects of superfine particles to improve physical properties of the cement. This method contains adding not more than 50 parts by weight of granulated material having a diameter of less than 2 mm composed of superfine particles having a diameter of not more than 1 μm and a grinding aid to 100 parts by weight of a clinker, and grinding the clinker. In this patent, examples of the grinding aid include amines such as triethanolamine and diethanolamine and glycols such as diethylene glycol.

JP-A 03-183647 describes a blended cement composition to which a higher trialkanolamine having at least one hydroxyalkyl group having 3 to 5 carbon atoms such as tri-isopropanolamine is added in order to increase a 7-day and a 28-day compressive strength curves to clear the minimum requirements for Portland cement.

JP-A 03-183647 further describes about the higher trialkanolamine that, an iron (III) ion, generating as a by-product in a solution during hydration of $C_4AF$, is highly insoluble at such high pH as a hydrated cement having and immediately forms an amorphous gel of iron (III) hydroxide to precipitate. The gel tends to coat cement particles to cause an overall delaying of hydration of the cement. The higher trialkanolamine used in the patent has some effects on iron complex formation at high pH to aid in removal of the iron-rich coating, thereby improving strength development of the cement (p. 7, right upper column, lines 9 to 19).

JP-A 2002-145651 describes a hydraulic composition produced from waste-derived materials such as incinerated ash of municipal solid waste or sewage sludge, in which a strength enhancer such as an alkanolamine is blended in order to increase a mechanical strength of the hydraulic composition.

WO-A 2009/022716 (corresponding to US-A 2011/0005432) describes a process of grinding a hydraulic compound in the presence of an alkylene oxide-adduct compound.

WO-A 2009/022717 (corresponding to US-A 2010/0319587) describes a process of grinding a hydraulic compound in the presence of glycerol and polyethylene glycol.

JP-B 2865149 (JP-A 03-183647) discloses an enhanced blended cement containing $C_4AF$, gypsum, a filler, and a higher trialkanolamine.

JP-A 2000-313648 discloses a mechanical strength enhancer for cement, containing an alkanolamine and a polyoxyalkylene block copolymer.

JP-A 2006-515826 (WO-A 2004/033386) discloses an amine used as an additive for cement processing.

JP-B 48-042697 discloses an additive composition for hydraulic cement.

U.S. Pat. No. 2,203,809 discloses a manufacture of a Portland cement. US-A 2009/0050023 discloses a hardening accelerator containing an aminoalcohol.

SUMMARY OF THE INVENTION

The present invention relates to a method for producing a hydraulic powder containing $C_3A$ in an amount of 0.5 to 9.5% by weight, including a step of grinding a hydraulic compound in the presence of an alkanolamine having a freezing point of not higher than 0° C. The present invention also relates to use of an alkanolamine having a freezing point of not higher than 0° C. as a grinding aid for a hydraulic compound.

The present invention also relates to a hydraulic powder containing $C_3A$ in an amount of 0.5 to 9.5% by weight, obtained by the method of the present invention.

The present invention also relates to a grinding aid for a hydraulic compound, containing an alkanolamine having a freezing point of not higher than 0° C.

DETAILED DESCRIPTION OF THE INVENTION

The methods for producing a hydraulic powder described in JP-A 05-147984 and JP-A 03-183647 need to use a compound for increasing a grinding efficiency and a compound for increasing a compressive strength in combination in order to achieve enhancement both in the grinding efficiency for a hydraulic compound and the compressive strength of a cured hydraulic composition containing the resultant hydraulic powder. In JP-A 2002-145651, there is no description about enhancement in grinding efficiency.

The present invention provides the method for producing a hydraulic powder, which achieves enhancement in the grinding efficiency for a hydraulic compound, that is, reduction of time to reach a desired particle size, and the compressive strength of a cured hydraulic composition containing the resultant hydraulic powder, such as a cement, by using a single compound.

Diethylene glycol is known to be a good grinding aid for hydraulic compounds, while amine compounds such as triisopropanolamine are known to well increase a compressive strength of a cured hydraulic composition containing a hydraulic powder. The present inventors have focused on the lower freezing point of diethylene glycol than other common grinding aid (e.g., −6.5° C. of diethylene glycol, 45° C. of triisopropanolamine, 22° C. of triethanolamine) and investigated for an advantageous amine compound for increasing a compressive strength, and found that an alkanolamine having a freezing point of not higher than 0° C. achieves enhancement in both grinding efficiency for a hydraulic compound and compressive strength of a cured hydraulic composition containing the resultant hydraulic powder. It has been further found that such an alkanolamine having a freezing point of not higher than 0° C. is remarkably effective in grinding for producing a hydraulic powder containing $C_3A$ in an amount of 0.5 to 9.5% by weight.

According to the present invention, provided is the method for producing a hydraulic powder, that achieves enhancement in both grinding efficiency for a hydraulic compound or reduction of a time to reach a desired particle size and compressive strength of a cured hydraulic composition containing the resultant hydraulic powder such as a cement by using the single compound.

Two reasons are considered for enhancement in grinding efficiency by a grinding aid. The first reason is prevention of electrostatic agglomeration. When a hydraulic compound such as a cement clinker is ground, it is known that intergranular fracture and transgranular fracture take place. In the transgranular fracture, a Ca—O ionic bond is cleaved to provide a cation ($Ca^{2+}$)-rich surface and an anion ($O^{2-}$)-rich surface. They are compressed, by an impact behavior of a grinder, so closely to each other within an electrostatic attractive force to cause agglomeration, thereby reducing a grinding efficiency.

The second reason is suppression of liquid bridging, which is agglomeration of ground particles via moisture derived from moisture in the air, water used for diluting a grinding aid, and/or water of crystallization of gypsum dihydrate. Dry grinding is thought to reduce a grinding efficiency due to liquid bridging on ground particles with moisture such as derived from the air, which moisture acts as a cushion between ground particles.

Use of the alkanolamine having a freezing point of not higher than 0° C. in grinding a hydraulic compound according to the present invention enables to grind the compound to a desired particle size within a short time. A detailed mechanism of action is still unknown, but is assumed that, the alkanolamine has a low freezing point and can hardly crystallize under normal grinding conditions. That is, the alkanolamine's molecules have a higher kinetic energy, and the alkanolamine thus forms a monomolecular layer on the surface of a ground substance for a short time in a relatively small dosage thereby to prevent the ground substance from electrostatic agglomeration and liquid bridging with moisture, resulting in enhancement of a grinding efficiency. The alkanolamine further having an alkyl group may more effectively prevent the liquid bridging with moisture by orientating the alkyl group outward from the surface of the ground substance. In cases of producing a hydraulic powder containing an increased amount of an interstitial material such as $C_3A$, the grinding step depends on the mechanical force dominantly and a difference between compounds as the grinding aid is expected to be small. The alkanolamine having a freezing point of not higher than 0° C. may be effective for enhancing a grinding efficiency in grinding a hydraulic compound containing $C_3A$ in an amount of not more than 9.5% by weight.

For increasing a compressive strength of a cured hydraulic composition, reduction of a porosity of the hydraulic composition by increasing respective hydration rates of minerals ($C_3S$, $C_2S$, $C_3A$, $C_4AF$) and further densification of a hydration product may be effective. In order to increase a 3-day, 7-day or more long-term compressive strength after contacting with water, densification of a hydration product is more effective. The hydration of ettringite, being needle crystals of a hydration product composed of $C_3A$, $C_4AF$ and gypsum, is promoted into a compact monosulfate effectively to enhance a 3-day or more long-term compressive strength after contacting with water. The alkanolamine according to the present invention exhibits an adequate chelating action to calcium that promotes solubilization of gypsum and thus may facilitate the hardening reaction between $C_3A$ and gypsum and the like, $C_3A$ being in the amount of not less than 0.5% by weight.

The alkanolamine having a freezing point of not higher than 0° C. according to the present invention may function in a different mechanism from that described in JP-A 03-183647. In JP-A 03-183647, an alkanolamine facilitates removal of an amorphous iron hydroxide gel generating during hydration of $C_4AF$, while the alkanolamine according to the present invention may facilitate the hydration of ettringite into a monosulfate by promoting solubilization of gypsum with its alkanolamine skeleton.

Examples of the alkanolamine having a freezing point of not higher than 0° C. include alkyldialkanolamines and dialkylmonoalkanolamines. For achieving enhancement in both grinding efficiency for a hydraulic compound and compressive strength of a cured hydraulic composition containing the resultant hydraulic powder, among these alkanolamines, preferred are alkyldialkanolamines. The alkanolamine according to the present invention has a freezing point of not higher than 0° C., and from the viewpoint of grinding efficiency for a hydraulic compound, more preferably not higher than −5° C., and even more preferably not higher than −10° C. From the viewpoints of ease of handling and enhancement in compressive strength, the freezing point is preferably not lower than −100° C., more preferably not lower than −80° C., even more preferably not lower than −60° C., and still even more preferably not lower than −30° C. Summarizing them together, the freezing point is preferably −100 to 0° C., more preferably −80 to −5° C., even more preferably −60 to −10° C., and still even more preferably −30° C. to −10° C. A value determined according to the measurement of freezing point (JIS K0065) can be considered as the freezing point. It is noted that, in the present invention, an alkanolamine having an undefined freezing point according to JIS K0065 can be considered as the alkanolamine having a freezing point of not higher than 0° C. if it has at least one physical property of a melting point of not higher than 0° C. (according to JIS K0064) and a fluidization point of not higher than 0° C. (according to JIS K2269).

Specific examples of the alkyldialkanolamine include alkyldiethanolamines having a linear alkyl group having 1 to 4 carbon atoms. Examples of the alkyldiethanolamine having a linear alkyl group having 1 to 4 carbon atoms include N-methyldiethanolamine (freezing point: −21° C.), N-ethyldiethanolamine (freezing point: −50° C.), N-n-propyldiethanolamine, and N-n-butyldiethanolamine (freezing point: −45° C.). For shortening a time for grinding a hydraulic compound, preferred are N-methyldiethanolamine and N-ethyldiethanolamine. For increasing a 3-day, a 7-day, and a 28-day compressive strengths of a cured hydraulic composition containing the resultant hydraulic powder after contacting with water, preferred is N-methyldiethanolamine.

Commercially available alkanolamines having a freezing point of not higher than 0° C. may be used. For increasing a solubility in water, the alkanolamine having a freezing point of not higher than 0° C. may be used in a salt form. Examples of the salt include sulfate, acetate, chloride, formate, carbonate, silicate, and hydroxide. The alkanolamine may be in the form of a salt or a mixture of the salts. Increasing solubility in water of the alkanolamine having a freezing point of not higher than 0° C. makes the handling of the alkanolamine easy. In cases of using the alkanolamine according to the present invention in a salt form, a weight of an amount used or the like of the alkanolamine described below is not a weight of the alkanolamine salt itself, but a calculated value from the weight of the salt based on the amine form.

The alkanolamine according to the present invention is in the liquid state at an ambient temperature such as 20° C., and is very easy to handle for measuring off an amount to be used for grinding a hydraulic compound, for adding, or the like. The alkanolamine having a freezing point of not higher than 0° C. may be used in the form of 100% by weight liquid, or preferably in the form of aqueous solution for more ease of handling. In this case, for shortening a time for grinding a hydraulic compound, a concentration of the alkanolamine having a freezing point of not higher than 0° C. is preferably not less than 10% by weight, more preferably not less than 20% by weight, even more preferably not less than 30% by weight, still even more preferably not less than 35% by weight, yet still even more preferably not less than 40% by weight, and even more preferably not less than 50% by weight. For more ease of handling such as operability, the concentration of the alkanolamine having a freezing point of not higher than 0° C. is preferably not more than 99.5% by weight and more preferably not more than 99% by weight. Summarizing them together, when the alkanolamine having a freezing point of not higher than 0° C. is used in the form of aqueous solution, a concentration of the alkanolamine is preferably 10 to 99.5% by weight, more preferably 20 to 99.5% by weight, even more preferably 30 to 99% by weight, still even more preferably 40 to 99% by weight, and yet still even more preferably 50 to 99% by weight. The alkanolamine is preferably used as is (concentration: 100%) or in the form of aqueous solution at a concentration of 30 to 99% by weight, more preferably 40 to 99% by weight, and even more preferably 50 to 99% by weight.

In the method for producing a hydraulic powder of the present invention, a hydraulic compound is ground to obtain the hydraulic powder. The "hydraulic compound" refers to a compound that is capable of hardening by reacting with water or that does not exhibit a capability of hardening alone but can interact with two or more other compounds via water to form a hydrate, thereby hardening. In a general hydraulic compound, an alkaline earth metal oxide and an oxide such as $SiO_2$, $Al_2O_3$, $Fe_2O_3$, $TiO_2$, $P_2O_5$, or $ZnO$ form a hydrate at ambient temperature or under hydrothermal conditions. A hydraulic powder contains a mineral. For example, a cement contains $3CaO.SiO_2$ ($C_3S$: alite), $2CaO.SiO_2$ ($C_2S$: belite), $3CaO.Al_2O_3$ ($C_3A$: calcium aluminate), and/or $4CaO.Al_2O_3.Fe_2O_3$ ($C_4AF$: calcium aluminoferrite). The hydraulic compound used in the present invention may also contain such a mineral.

For shortening a time for grinding a hydraulic compound in the presence of the alkanolamine having a freezing point of not higher than 0° C. according to the present invention, the hydraulic powder produced from the hydraulic compound according to the present invention contains $C_3A$ in an amount of not more than 9.5% by weight, and preferably not more than 9.0% by weight. For increasing a 24-hour and a 7-day compressive strengths of a cured hydraulic composition containing the hydraulic powder, the hydraulic powder contains $C_3A$ in an amount of not less than 0.5% by weight, preferably not less than 1.0% by weight, more preferably not less than 5.0% by weight, even more preferably not less than 7.0% by weight, and still even more preferably not less than 8.0% by weight. Summarizing them together, the hydraulic compound is preferably adjusted to have such a composition as that the resultant hydraulic powder contains $C_3A$ in an amount of 0.5 to 9.5% by weight, preferably 1.0 to 9.0% by weight, more preferably 5.0 to 9.0% by weight, even more preferably 7.0 to 9.0% by weight, and still even more preferably 8.0 to 9.0% by weight. $C_3A$ serves as an interstitial material between $C_3S$ and $C_2S$ in the hydraulic compound. To adjust a content of $C_3A$ in the resultant hydraulic powder from grinding, for example, the production of the hydraulic compound can contain a step of calcining a raw material of the hydraulic compound (e.g., clinker) at a temperature not lower than 1250° C., preferably 1300 to 1450° C., and more preferably 1350 to 1450° C.

Furthermore, for increasing a 24-hour and a 7-day compressive strengths of a cured hydraulic composition containing the hydraulic powder, the hydraulic compound is further preferably adjusted to have such a composition as that the resultant hydraulic powder contains $C_4AF$ in an amount of not more than 11% by weight, more preferably 0.1 to 10% by weight, and even more preferably 0.1 to 9.5% by weight. Contents of $C_3A$ and $C_4AF$ in the hydraulic powder are determined by the method for quantifying respective minerals described in Examples.

Examples of the hydraulic compound include minerals ($C_3S$, $C_2S$, $C_3A$, $C_4AF$) contained in cements, slag, fly ash, limestone, iron slag, gypsum, alumina, and incinerated ash. These can be used as a raw material for the hydraulic powder.

When the hydraulic powder is a Portland cement, it is produced, for example, by pre-grinding a clinker (also referred to as a cement clinker, and in some cases, contains gypsum), which is the hydraulic compound produced by firing a raw material such as limestone, clay, and iron slag, adding an adequate amount of gypsum, and grinding to turn out to be a powder having a specific surface area with a Blaine value of not less than 2500 cm$^2$/g. The "Blaine value" refers to a specific surface area measured by the Blaine method. The present invention is to produce a hydraulic powder containing $C_3A$ in an amount of 0.5 to 9.5% by weight. This is generally achieved by using a hydraulic compound such as a clinker containing $C_3A$ within this range. In cases of further using other materials such as gypsum, an amount of other material added is adjusted with consideration of a composition of the material such that the resultant hydraulic powder from grinding contains $C_3A$ within the given range. The present invention encompasses a method for producing a Portland cement, containing a step of grinding a clinker in the presence of the alkanolamine having a freezing point of not higher than 0° C.

The alkanolamine having a freezing point of not higher than 0° C. according to the present invention serves as a grinding aid in grinding the hydraulic compound, preferably a clinker, and more preferably in grinding to turn out to be a finished powder. For grinding a hydraulic compound such as a cement clinker to a desired particle size within a short time, the alkanolamine having a freezing point of not higher than 0° C. is used in an amount of 0.001 to 0.20 parts by weight, preferably 0.003 to 0.15 parts by weight, more preferably 0.005 to 0.10 parts by weight, even more preferably 0.01 to 0.10 parts by weight, still even more preferably 0.02 to 0.10 parts by weight, yet still even more preferably 0.03 to 0.10 parts by weight, and yet still even more preferably 0.03 to 0.07 parts by weight of solids to 100 parts by weight of the hydraulic compound. This amount is based on the total amount of the alkanolamine used in the step of grinding the hydraulic compound, preferably until the end of the grinding of the hydraulic compound, more preferably until reaching an intended Blaine value.

To perform the grinding in the presence of the alkanolamine having a freezing point of not higher than 0° C., the alkanolamine is preferably added to a raw material including a hydraulic compound such as a clinker. Examples of the method of addition include dropping and spraying the alkanolamine having a freezing point of not higher than 0° C. with or without other component(s) in the liquid state and preferably in the form of aqueous solution. Examples of the other component include antifoaming agents, water, and other known grinding aids excluding the alkanolamine having a freezing point of not higher than 0° C. The alkanolamine and other component (s), may be added to the raw material including a hydraulic compound all at once or in divided fractions of the ultimate amount, continuously or intermittently.

In the grinding in the presence of the alkanolamine having a freezing point of not higher than 0° C., an acid can also be used together to enhance both a grinding efficiency for a hydraulic compound and a 7-day compressive strength of a cured hydraulic composition. Examples of the acid include sulfuric acid and acetic acid. For enhancing both a grinding efficiency for a hydraulic compound and a 7-day compressive strength of a cured hydraulic composition, the acid is preferably used in an amount of 0.1 to 5 mol, more preferably 0.3 to 2.5 mol, and even more preferably 0.5 to 1.0 mol to 1 mol of the alkanolamine having a freezing point of not higher than 0° C.

For enhancing both a grinding efficiency and a 7-day compressive strength, the acid is preferably used in an amount of 0.00025 to 0.165 parts by weight, more preferably 0.001 to 0.124 parts by weight, even more preferably 0.005 to 0.085 parts by weight, still even more preferably 0.007 to 0.060 parts by weight, yet still even more preferably 0.010 to 0.030 parts by weight, and yet still even more preferably 0.010 to 0.020 parts by weight to 100 parts by weight of a hydraulic compound to be ground such as a cement clinker.

Furthermore, in the grinding in the presence of the alkanolamine having a freezing point of not higher than 0° C., a combination of a polyol having 3 to 8 carbon atoms with the alkanolamine and particularly with N-methyldiethanolamine can increase a 7-day compressive strength of a cured hydraulic composition.

The "polyol having 3 to 8 carbon atoms" refers to a compound having 3 to 8 carbon atoms and two or more hydroxy groups. The polyol having 3 to 8 carbon atoms according to the present invention excludes N-methyldiethanolamine. Commercially available polyols having 3 to 8 carbon atoms may be used in the present invention. From the viewpoint of expression of a 24-hour compressive strength of a cured hydraulic composition, the polyol preferably has 3 to 6 carbon atoms, and more preferably 4 to 6 carbon atoms. For suppressing liquid bridging in the grinding of a hydraulic compound in order to shorten a time for grinding, the polyol preferably has two to four hydroxy groups and more preferably two or three hydroxy groups.

The polyol having 3 to 8 carbon atoms preferably contains only carbon, hydrogen, and oxygen atoms, because such a polyol has high adsorbability on a broken-out section of a ground hydraulic compound and can shorten a time for grinding the hydraulic compound. Specific examples of the polyol include glycerol, diglycerol, diethylene glycol, propylene glycol, triethylene glycol, dipropylene glycol, pentanediol, hexanediol, heptanediol, octanediol, butanediol, butynediol, and butenediol, and ethylene oxide-adducts thereof. For enhancing a grinding efficiency for a hydraulic compound, among these polyols, preferably used is one or more polyols selected from the group having diethylene glycol, propylene glycol, glycerol, diglycerol, and glycerol-ethylene oxide adducts, and more preferably selected from the group having diethylene glycol, propylene glycol, and glycerol-ethylene oxide adducts. In an ethylene oxide adduct, ethylene oxide is added in such an amount on the average that the adduct has 3 to 8 carbon atoms in total. For shortening a time for grinding a hydraulic compound, an average mole number of added ethylene oxide is preferably 0.5 to 2. From the viewpoints of grinding efficiency for a hydraulic compound and expression of a 24-hour compressive strength of a cured hydraulic composition, preferably used is one or more polyols selected from the group having glycerol and glycerol-ethylene oxide adducts, and more preferably glycerol. From the viewpoints of grinding efficiency for a hydraulic compound and expression of a 7-day compressive strength of a cured hydraulic composition, preferably used is one or more polyols selected from the group having diethylene glycol and diglycerol.

In the present invention, for enhancing a grinding efficiency for a hydraulic compound, a weight ratio of N-methyldiethanolamine to the polyol having 3 to 8 carbon atoms, N-methyldiethanolamine/polyol having 3 to 8 carbon atoms, is preferably 4/6 to 9/1, more preferably 5/5 to 9/1, and even more preferably 6/4 to 8/2. For increasing a 24-hour compressive strength of a cured hydraulic composition, the weight ratio of N-methyldiethanolamine to the polyol having 3 to 8 carbon atoms is preferably 1/9 to 8/2, more preferably 3/7 to 8/2, and even more preferably 5/5 to 8/2. For increasing a 7-day compressive strength of a cured hydraulic composition, the weight ratio is preferably 3/7 to 9/1, more preferably 4/6 to 9/1, and even more preferably 5/5 to 9/1. For enhancing both a grinding efficiency for a hydraulic compound and a 7-day and a 24-hour compressive strengths of a cured hydraulic composition, the weight ratio is particularly preferably 5/5 to 8/2.

For enhancing both a grinding efficiency for a hydraulic compound and a 7-day and a 24-hour compressive strengths of a cured hydraulic composition, the polyol is preferably used in an amount of 0.001 to 0.1 parts by weight, more preferably 0.001 to 0.05 parts by weight, even more preferably 0.005 to 0.04 parts by weight, still even more preferably 0.01 to 0.04 parts by weight, and yet still even more preferably 0.02 to 0.03 parts by weight of solids to 100 parts by weight of the hydraulic compound to be ground such as a cement clinker.

For enhancing both a grinding efficiency for a hydraulic compound and a 7-day and a 24-hour compressive strengths of a cured hydraulic composition, the total amount of N-methyldiethanolamine and the polyol having 3 to 8 carbon atoms is preferably 0.011 to 0.2 parts by weight, more preferably 0.011 to 0.1 parts by weight, even more preferably 0.011 to 0.08 parts by weight, still even more preferably 0.02 to 0.08 parts by weight, and yet still even more preferably 0.04 to 0.06 parts by weight of the total solids to 100 parts by weight of the hydraulic compound to be ground such as a cement clinker.

To perform the grinding in the presence of N-methyldiethanolamine and the polyol having 3 to 8 carbon atoms, a mixture of N-methyldiethanolamine and the polyol having 3 to 8 carbon atoms are preferably added to a raw material to be ground containing a hydraulic compound such as a clinker. Examples of a method of addition include dropping and spraying the mixture with or without other component (s) in the liquid state and preferably in the form of aqueous solution. The liquid mixture may be added to the raw material including the hydraulic compound all at once or as divided fractions of the ultimate amount, and continuously or intermittently. N-methyldiethanolamine and the polyol having 3 to 8 carbon atoms may be added separately.

Furthermore, in the grinding in the presence of the alkanolamine having a freezing point of not higher than 0° C., a combination of glycerol monoacetate with the alkanolamine and particularly with N-methyldiethanolamine can increase a 24-hour and a 7-day compressive strengths of a cured hydraulic composition.

Commercially available glycerol monoacetate may be used. Glycerol diacetate and glycerol triacetate, which have ester groups in a molecule, are inferior in enhancement of a grinding efficiency of a hydraulic compound and a compressive strength to glycerol monoacetate.

For enhancing both a grinding efficiency for a hydraulic compound and a compressive strength of a cured hydraulic composition, a weight ratio of glycerol monoacetate to N-methyldiethanolamine, glycerol monoacetate/N-methyldiethanolamine, is preferably 2/8 to 8/2, more preferably 3/7 to 7/3, even more preferably 4/6 to 6/4, and still even more preferably 4.5/5.5 to 5.5/4.5. Furthermore, for enhancing a 7-day compressive strength of a cured hydraulic composition, the weight ratio, glycerol monoacetate/N-methyldiethanolamine, is preferably 1/9 to 7/3, more preferably 2/8 to 7/3, even more preferably 2/8 to 4/6, and still even more preferably 2.5/7.5 to 3.5/6.5.

For grinding a hydraulic compound such as a cement clinker to a desired particle size within a short time, glycerol monoacetate is preferably used in an amount of 0.0005 to 0.1 parts by weight, more preferably 0.0025 to 0.05 parts by weight, even more preferably 0.005 to 0.04 parts by weight, still even more preferably 0.010 to 0.030 parts by weight, and yet still even more preferably 0.018 to 0.025 parts by weight to 100 parts by weight of the hydraulic compound to be ground. For increasing a 24-hour compressive strength of a cured hydraulic composition, glycerol monoacetate is preferably used in an amount of 0.010 to 0.030 parts by weight, and more preferably 0.018 to 0.025 parts by weight to 100 parts by weight of the hydraulic compound such as a cement clinker. Furthermore, for increasing a 7-day compressive strength of a cured hydraulic composition, glycerol monoacetate is preferably used in an amount of 0.005 to 0.030 parts by weight, and more preferably 0.010 to 0.015 parts by weight to 100 parts by weight of the hydraulic compound such as a cement clinker. Furthermore, for grinding a hydraulic compound such as a cement clinker to a desired particle size within a short time and enhancing a 24-hour and a 7-day compressive strengths of a cured hydraulic composition, glycerol monoacetate is preferably used in an amount of 0.005 to 0.04 parts by weight, more preferably 0.010 to 0.030 parts by weight, and even more preferably 0.010 to 0.025 parts by weight to 100 parts by weight of the hydraulic compound to be ground.

For grinding a hydraulic compound such as a cement clinker to a desired particle size within a short time, the total amount of glycerol monoacetate and N-methyldiethanolamine used is preferably in 0.001 to 0.2 parts by weight, more preferably 0.005 to 0.1 parts by weight, even more preferably 0.01 to 0.08 parts by weight, still even more preferably 0.020 to 0.060 parts by weight, and yet still even more preferably 0.033 to 0.047 parts by weight of the total solids to 100 parts by weight of the hydraulic compound to be ground. For increasing a 24-hour compressive strength of a cured hydraulic composition, the total amount of glycerol monoacetate and N-methyldiethanolamine is preferably 0.020 to 0.060 parts by weight, and more preferably 0.033 to 0.047 parts by weight of the total solids to 100 parts by weight of the hydraulic compound such as a cement clinker. For increasing a 7-day compressive strength of a cured hydraulic composition, the total amount of glycerol monoacetate and N-methyldiethanolamine is preferably 0.015 to 0.065 parts by weight, and more preferably 0.035 to 0.045 parts by weight to 100 parts by weight of the hydraulic compound such as a cement clinker. For grinding a hydraulic compound such as a cement clinker to a desired particle size within a short time and increasing a 24-hour and a 7-day compressive strengths of a cured hydraulic composition, the total amount of glycerol monoacetate and N-methyldiethanolamine is preferably 0.010 to 0.08 parts by weight, more preferably 0.020 to 0.060 parts by weight, and even more preferably 0.025 to 0.055 parts by weight to 100 parts by weight of the hydraulic compound to be ground.

To perform the grinding in the presence of glycerol monoacetate and N-methyldiethanolamine, glycerol monoacetate and N-methyldiethanolamine are preferably added as a mixture thereof to a raw material including a hydraulic compound such as a clinker. Examples of a method of addition include dropping and spraying a mixture of glycerol monoacetate and N-methyldiethanolamine with or without other component(s), preferably in the form of aqueous solution. The mixture may be added to the raw material including the hydraulic compound all at once or as divided fractions of the ultimate amount, and continuously or intermittently. Furthermore, glycerol monoacetate and N-methyldiethanolamine may be added separately.

In the method for producing a hydraulic powder of the present invention, grinding conditions can be adjusted to produce a powder having an appropriate particle size in view of a raw material, an intended use and the like. In general, a hydraulic compound such as a clinker is preferably ground to obtain a powder having a Blaine specific surface area value of 2500 to 5000 cm$^2$/g, and more preferably 3000 to 4000 cm$^2$/g. An intended Blaine value can be achieved, for example, by regulating a time for grinding. The longer time for grinding tends to result in the higher Blaine value, and the shorter time, the lower Blaine value.

In the present invention, any grinding apparatus can be used for grinding a hydraulic compound. Examples of the grinding apparatus include a ball mill commonly used in grinding a cement or the like. A grinding medium (grinding ball) of the apparatus is preferably made of a material having the equal or higher hardness than a substance to be ground (for example, calcium aluminate for grinding a cement clinker). Examples of the material of common commercial products include steel, stainless steel, alumina, zirconia, titania, and tungsten carbide.

For enhancing a grinding efficiency for a hydraulic compound, the hydraulic powder produced by the method of the present invention preferably contains the alkanolamine having a freezing point of not higher than 0° C. in an amount of 0.0005 to 0.20% by weight, more preferably 0.003 to 0.15% by weight, even more preferably 0.0025 to 0.10% by weight, still even more preferably 0.005 to 0.10% by weight, yet still even more preferably 0.01 to 0.10% by weight, yet still even more preferably 0.015 to 0.10% by weight, and yet still even more preferably 0.015 to 0.07% by weight.

For shortening a time for grinding a hydraulic compound in the production according to the present invention, the hydraulic powder produced by the method of the present invention preferably contains $C_3A$ in an amount of not more than 9.5% by weight, and more preferably not more than 9.0% by weight. For increasing a compressive strength of a cured hydraulic composition, the content of $C_3A$ in the hydraulic powder is preferably not less than 0.5% by weight, more preferably not less than 1.0% by weight, even more preferably not less than 5.0% by weight, still even more preferably not less than 7.0% by weight, and yet still even more preferably not less than 8.0% by weight. Summarizing them together, the content of $C_3A$ in the hydraulic powder is preferably 0.5 to 9.5% by weight, more preferably 1.0 to 9.0% by weight, even more preferably 5.0 to 9.0% by weight, still even more preferably 7.0 to 9.0% by weight, and yet still even more preferably 8.0 to 9.0% by weight. For increasing a compressive strength of a cured hydraulic composition, a content of $C_4AF$ in the hydraulic powder is preferably not more than 11% by weight, more preferably 0.1 to 10% by weight, and even more preferably 0.1 to 9.5% by weight. Contents of $C_3A$ and $C_4AF$ in the hydraulic powder are determined by the method for quantifying respective minerals described in Examples.

The alkanolamine having a freezing point of not higher than 0° C. according to the present invention can be used as a grinding aid in grinding a hydraulic compound to enhance a grinding efficiency and can provide a hydraulic composition exhibiting an increased compressive strength when hardened.

The alkanolamine having a freezing point of not higher than 0° C. according to the present invention is suitably used as a grinding aid for grinding a hydraulic compound and particularly for a clinker. In other words, the present invention provides a method for grinding a hydraulic compound, using the alkanolamine having a freezing point of not higher than 0°

C. as a grinding aid in grinding the hydraulic compound. In this method, for shortening a time for grinding, the alkanolamine having a freezing point of not higher than 0° C. is preferably used in an amount of 0.001 to 0.5 parts by weight, more preferably 0.001 to 0.2 parts by weight, even more preferably 0.005 to 0.2 parts by weight, and still even more preferably 0.01 to 0.1 parts by weight of solids to 100 parts by weight of a hydraulic compound. Particularly for a clinker, for shortening a time for grinding, the alkanolamine having a freezing point of not higher than 0° C. is preferably used in an amount of 0.001 to 0.20 parts by weight, more preferably 0.003 to 0.15 parts by weight, even more preferably 0.005 to 0.10 parts by weight, still even more preferably 0.01 to 0.10 parts by weight, yet still even more preferably 0.02 to 0.10 parts by weight, yet still even more preferably 0.03 to 0.1 parts by weight, and yet still even more preferably 0.03 to 0.07 parts by weigh of solids to 100 parts by weight of a clinker.

Incases of using an aqueous solution of the alkanolamine having a freezing point of not higher than 0° C., for shortening a time for grinding a hydraulic compound, the aqueous solution is preferably used in an amount of not more than 0.20 part by weight, more preferably not more than 0.15 part by weight, even more preferably not more than 0.10 parts by weight, and still even more preferably not more than 0.08 parts by weight to 100 parts by weight of the hydraulic compound. Furthermore, from the viewpoints of grinding efficiency for a hydraulic compound and operability such as measuring and adding in grinding the hydraulic compound, an amount of water of the aqueous solution is preferably 0.0001 to 0.20 parts by weight, more preferably 0.0001 to 0.10 parts by weight, even more preferably 0.001 to 0.10 parts by weight, still even more preferably 0.001 to 0.08 parts by weight, yet still even more preferably 0.001 to 0.07 parts by weight, and yet still even more preferably 0.001 to 0.05 parts by weight to 100 parts by weight of the hydraulic compound. The amount of water is based on the total amount of the aqueous solution used in the step of grinding a hydraulic compound, specifically until the hydraulic compound is completely ground, more specifically ground to reach an intended Blaine value.

Two or more alkanolamines each having a freezing point of not higher than 0° C. may be used together, but preferably a single alkanolamine having a freezing point of not higher than 0° C. is used. Although the present invention can achieve enhancement in both grinding efficiency for a hydraulic compound and compressive strength of a cured hydraulic composition by using the single alkanolamine, other known grinding aids than the alkanolamine having a freezing point of not higher than 0° C. may be further used together with the alkanolamine in order to adapt to a wide variety of conditions for grinding. Examples of the known grinding aid include known grinding aid such as diethylene glycol and other alkanolamines such as triethanolamine and diethanolamine, and from the viewpoint of safety, naturally derived glycerol, glycerol-ethylene oxide adducts, and glycerol-propylene oxide adducts.

For preventing reduction in strength due to an increased amount of air in a hydraulic composition, a defoaming agent can further be used together. Furthermore, the defoaming agent can be used from the stage of grinding a hydraulic compound to be uniformly distributed throughout the surface of the resultant hydraulic powder, thereby more effectively producing the preventive effect. That is, the present invention provides a method for producing a hydraulic powder, including a step of grinding a hydraulic compound in the presence of the alkanolamine having a freezing point of not higher than 0° C. and a defoaming agent. The method can produce a hydraulic powder, such as a cement, with a high grinding efficiency for a shortened grinding time to reach a desired particle size, producing a hydraulic composition exhibiting a compressive strength having no reduction caused by an increased amount of air in the composition, when hardened.

Examples of the defoaming agent include silicone, fatty acid ester, and ether defoaming agents. Preferred are dimethylpolysiloxane for the silicone defoaming agent, polyalkylene glycol fatty acid ester for the fatty acid ester defoaming agent, and polyalkylene glycol ether for the ether defoaming agent.

Among defoaming agents, preferably used are fatty acid ester defoaming agents for suppression of reduction in compressive strength caused by an increased amount of air in a hardened hydraulic composition.

The silicone defoaming agent is preferably in an emulsion form compatible with water. Examples of the emulsion include commercial products such as KM-70 and KM-73A (both from Shin-Etsu Chemical Co., Ltd.), TSA series (Momentive Performance materials Inc.), FS anti-foam series (Dow Corning Toray Co., Ltd.), and anti-foam E-20 (Kao Corporation).

Examples of the fatty acid ester defoaming agent include commercial products mainly composed of polyalkylene glycol fatty acid ester such as Rheodol TW-L120 (Kao Corporation), Nicofix, and Foamlex (both from Nicca Chemical Co., Ltd.).

Examples of the ether defoaming agent include commercially available polyalkylene glycol ether defoaming agents such as polyoxypropylene (average addition mole number: 3) lauryl ether [defoaming agent No. 8, Kao Corporation] and polyoxypropylene (average addition mole number: 3) polyoxyethylene (average addition mole number: 1) lauryl ether [defoaming agent No. 11, Kao Corporation], and other commercial products such as SN defoamer-15-P, Foamaster PC [both from San Nopco Limited], Adeka Pluronic series [Adeka Corporation].

For suppressing reduction in strength caused by an increased amount of air, a weight ratio of the alkanolamine (a) to the defoaming agent (b), (a)/(b), is preferably 99/1 to 50/50, more preferably 97/3 to 60/40, and even more preferably 95/5 to 70/30. The weight ratio is calculated based on effective amounts (solid contents) of the alkanolamine (a) having a freezing point of not higher than 0° C. and the defoaming agent (b).

Furthermore, for enhancing both a grinding efficiency for a hydraulic compound and a 7-day compressive strength of a cured hydraulic composition, the grinding aid of the present invention can further contain an acid. Examples of the acid include sulfuric and acetic acids. For enhancing both a grinding efficiency for a hydraulic compound and a 7-day compressive strength of a cured hydraulic composition, an amount of the acid used is preferably 0.1 to 5 mol, more preferably 0.3 to 2.5 mol, and even more preferably 0.5 to 1.0 mol to 1 mol of the alkanolamine having a freezing point of not higher than 0° C.

A hydraulic composition prepared with the hydraulic powder produced by the method of the present invention exhibits an increased compressive strength by hardening. When the hydraulic powder contains $C_3A$ in an amount of 0.5 to 9.5% by weight, the increased compressive strength is remarkable. Examples of the hydraulic powder include Portland cement, blast furnace slag, alumina cement, fly ash, limestone, and gypsum.

The hydraulic powder produced by the method of the present invention can be used as a raw material for concrete constructions and products. A concrete prepared with the hydraulic powder obtained by the method of the present invention advantageously has increased 3-day, 7-day, and 28-day compressive strengths after contacting with water. Therefore, the hydraulic powder obtained by the method of the present invention can provide a concrete being, in 3-day, 7-day, and 28-day compressive strengths, equal to or higher than that of a concrete prepared with a hydraulic powder produced by a method other than the present invention, even when a hydraulic powder having a low solidification strength at an early age after contacting with water (e.g., blast furnace slag, fly ash, or limestone) is mixed with or substituted for the hydraulic powder of the present invention.

EXAMPLES

Examples and Comparative Examples will be described below. Examples are intended to illustrate the present invention, and not to limit the present invention.

Examples 1 to 4 and Comparative Examples 1 to 7

Cements were produced from the following materials in amounts shown below by grinding all at once in a ball mill. These cements were used to prepare hydraulic compositions. For each cement and each resultant hydraulic composition, a grinding efficiency (grinding time to reach an intended Blaine value) in production of the cement and a compressive strength test of the cured hydraulic composition were evaluated as described below. Results are shown in Table 1. In Example 4, a defoaming agent (fatty acid ester defoaming agent, Nicca Chemical Co., Ltd. Foamlex 797) was used together with an alkanolamine in an amount of 10 parts by weight of the agent to 90 parts by weight of the alkanolamine.

(1-1) Materials Used
 clinker: clinker for ordinary Portland cement prepared by blending raw materials containing limestone, clay, siliceous stone, and iron oxide and the like in such amounts as that the clinker contains about 65% CaO, about 22% $SiO_2$, about 5% $Al_2O_3$, about 3% $Fe_2O_3$, and about 3% MgO and others (based on weight), firing, and pre-grinding with a crusher and a grinder (in a form of particles passing through a 3.5 mm-mesh screen).
 gypsum dihydrate: gypsum containing 45.93% by weight of $SO_3$.
 grinding aid: see Table 1.
(1-2) Amount Used
 clinker: 1000 g
 gypsum dihydrate: 37.0 g (1.7 parts by weight of $SO_3$ to 100 parts by weight of a clinker)
 grinding aid: each compound shown in Table 1 was used in the form of 50% by weight aqueous solution such that the compound was added in an amount as shown in Table 1 to 100 parts by weight of a hydraulic compound (clinker)

(1-3) Ball Mill
 AXB-15 (Seiwa Giken Co., Ltd.) including a stainless pot having a volume of 18 L (outer diameter: 300 mm) and 100 stainless balls composed of 30 balls having a size of 30 mmφ (nominal diameter: 1¼) and 70 balls having a size of 20 mmφ (nominal diameter: ¾) in total were used at a rotation number of 35 rpm. During grinding, a part of a ground mixture was sampled.
(1-4) Grinding Time to Reach an Intended Size
 A target Blaine value was set to 3300±100 $cm^2/g$. Samples were taken after 60 minutes, 75 minutes, and 90 minutes from the start of grinding and measured for Blaine value. Blaine values were determined by measuring time to reach the target Blaine value 3300 $cm^2/g$ with a quadratic regression on Microsoft Excel 2003. The calculated time was considered as a completion time (grinding time to reach an intended size), and the grinding was stopped. For measuring a Blaine value, used was a Blaine air permeability apparatus defined in Physical Testing Methods for Cement (JIS R 5201). A difference of grinding time to reach an intended size in this testing method will become a bigger difference in an actual apparatus level. The shorter grinding time means the better grinding efficiency. Each cement resulting from the grinding for this grinding time contained 63.1% by weight of $C_2S$, 16.2% by weight of $C_2S$, 8.6% by weight of $C_3A$, and 8.5% by weight of $C_4AF$. The cement corresponds to Cement C in Table 4 described below.

In these Examples, minerals in a hydraulic powder were quantified by the following method (the same was applied to other Examples and the like). A powder X-ray diffraction apparatus RINT-2500 (Rigaku Corporation) was used under measurement conditions of: target: CuKα, tube current: 40 mA, tube voltage: 200 kV, and scanning range: 5 to 70 deg. 2θ; and scanning conditions of: step scan, step width: 0.02°, and measurement time per step: 2 seconds. 0.3 g of standard substance "α-corundum ($Al_2O_3$)" was added to 2.7 g of hydraulic powder. The peak area of the standard substance was used as a standard in quantification with a Rietveld analysis software. The software used was PDXL Ver.1.8 from Rigaku Corporation.
(1-5) Compressive Strength Test
 A compressive strength was measured in accordance with Physical Testing Methods for Cement (JIS R 5201) Annex No. 2 (Testing Methods for Cement-measurement of strength). Cements having a Blaine value of 3300±100 $cm^2/g$ produced above were measured. A cement having the higher compressive strength is more desirable for production of concrete products and structures.

TABLE 1

| | | Grinding aid | | Grinding time to reach an intended size (min.) | Grinding time to reach an intended size (relative value) | Compressive strength ($N/mm^2$) | | | Compressive strength (relative value) | | |
|---|---|---|---|---|---|---|---|---|---|---|---|
| | Kind | Freezing point (° C.) | Dosage to 100 parts by weight of clinker (parts by weight) | | | After 3 days | After 7 days | After 28 days | After 3 days | After 7 days | After 28 days |
| Example | 1 N-methyldiethanolamine | −21 | 0.04 | 101 | 71 | 35.6 | 48.0 | 64.0 | 126 | 117 | 110 |
| | 2 N-ethyldiethanolamine | −50 | 0.04 | 102 | 71 | 34.3 | 46.4 | 61.7 | 121 | 113 | 106 |
| | 3 N-n-butyldiethanolamine | −45 | 0.04 | 104 | 73 | 33.8 | 46.0 | 61.2 | 119 | 112 | 105 |
| | 4 N-methyldiethanolamine Defoaming agent (Foamlex 797) | −21 — | 0.044 | 101 | 71 | 35.7 | 47.8 | 63.8 | 126 | 117 | 109 |
| Comparative Example | 1 Diethylene glycol | −6.5 | 0.04 | 100 | 70 | 33.2 | 45.2 | 60.4 | 117 | 111 | 103 |
| | 2 Monoethanolamine | 10 | 0.04 | 112 | 78 | 27.9 | 40.3 | 57.6 | 99 | 99 | 99 |
| | 3 Triethanolamine | 22 | 0.04 | 109 | 76 | 33.2 | 45.2 | 59.1 | 117 | 111 | 101 |

TABLE 1-continued

| | Grinding aid | | | Grinding time to reach an intended | Grinding time to reach an intended | Compressive strength (N/mm$^2$) | | | Compressive strength (relative value) | | |
|---|---|---|---|---|---|---|---|---|---|---|---|
| Kind | | Freezing point (° C.) | Dosage to 100 parts by weight of clinker (parts by weight) | size (min.) | size (relative value) | After 3 days | After 7 days | After 28 days | After 3 days | After 7 days | After 28 days |
| 4 Diethanolamine | | 28 | 0.04 | 105 | 73 | 32.9 | 45.3 | 62.4 | 116 | 111 | 107 |
| 5 Triisopropanolamine | | 45 | 0.04 | 106 | 74 | 34.8 | 48.1 | 64.7 | 123 | 118 | 111 |
| 6 N-t-butyldiethanolamine | | 45 | 0.04 | 110 | 77 | 28.1 | 40.2 | 55.3 | 99 | 98 | 95 |
| 7 Not added (standard) | | — | — | 143 | 100 | 28.3 | 40.9 | 58.4 | 100 | 100 | 100 |

Examples 1 to 4 using an alkanolamine having a freezing point of not higher than 0° C. as the grinding aid showed better results in both grinding time to reach an intended size and compressive strength. Comparative Examples 1 and 4 using diethylene glycol and diethanolamine, respectively, resulted in lower compressive strengths. Comparative Example 5 using triisopropanolamine taken a longer grinding time to reach an intended size. Comparative Examples 2, 3, and 6 using respective amines showed worse results in both grinding time to reach an intended size and compressive strength than that of Examples 1 to 4.

Example 5 and Comparative Example 8

A clinker was ground in the same way as in Example 1, except that a 50% aqueous solution of a grinding aid of N-methyldiethanolamine or triisopropanolamine having a concentration shown in Table 2 was used. A grinding time to reach an intended size was determined in the same way as in Example 1. Results are shown in Table 2.

A comparison between N-methyldiethanolamine and triisopropanolamine under the same concentration in an aqueous solution showed that N-methyldiethanolamine resulted in a better grinding efficiency at any concentration.

Example 6

N-methyldiethanolamine in different amounts shown in Table 3 was used as the grinding aid in grinding a clinker in the same way as in Example 1. Each grinding time to reach an

TABLE 2

| | | Grinding aid | | Dosage to 100 parts by weight of clinker (parts by weight) | | | Grinding time to reach an intended size (min.) | Grinding time to reach an intended size (relative value) |
|---|---|---|---|---|---|---|---|---|
| | | Kind | Grinding aid concentration in aqueous solution thereof (% by weight) | Additive for grinding | Water | Total | | |
| Example | 5-1 | N-methyl diethanolamine | 100 | 0.04 | 0 | 0.04 | 101 | 71 |
| | 5-2 *[1] | | 50 | 0.04 | 0.04 | 0.08 | 101 | 71 |
| | 5-3 | | 40 | 0.04 | 0.06 | 0.10 | 102 | 71 |
| | 5-4 | | 32 | 0.04 | 0.085 | 0.125 | 104 | 73 |
| | 5-5 | | 25 | 0.04 | 0.12 | 0.16 | 108 | 76 |
| | 5-6 | | 20 | 0.04 | 0.16 | 0.20 | 109 | 76 |
| Comparative example | 8-1 *[2] | Triisopanolamine | 50 | 0.04 | 0.04 | 0.08 | 106 | 74 |
| | 8-2 | | 32 | 0.04 | 0.085 | 0.125 | 110 | 77 |
| | 8-3 | | 20 | 0.04 | 0.16 | 0.20 | 115 | 80 |

*[1] Corresponding to Example 1
*[2] Corresponding to comparative example 5 intended size was determined in the same way. Results are shown in Table 3.

TABLE 3

| | | grinding aid | | Grinding time to reach an intended size (min.) | Grinding time to reach an intended size (relative value) |
|---|---|---|---|---|---|
| | | Kind | Dosage to 100 parts by weight of Clinker (parts by weight) | | |
| Example | 6-1 | N-ethyldiethanolamine | 0.005 | 136 | 95 |
| | 6-2 | N-ethyldiethanolamine | 0.01 | 118 | 83 |
| | 6-3 | N-ethyldiethanolamine | 0.02 | 107 | 75 |

TABLE 3-continued

| | | grinding aid | | Grinding time to reach an intended size (min.) | Grinding time to reach an intended size (relative value) |
|---|---|---|---|---|---|
| | | Kind | Dosage to 100 parts by weight of Clinker (parts by weight) | | |
| | 6-4* | N-ethyldiethanolamine | 0.04 | 101 | 71 |
| | 6-5 | N-ethyldiethanolamine | 0.06 | 102 | 71 |
| | 6-6 | N-ethyldiethanolamine | 0.10 | 103 | 72 |

*Corresponding to Example 1

Results showed that N-methyldiethanolamine in an amount of 0.04 parts by weight or 0.06 parts by weight to 100 parts by weight of clinker provided a very good grinding efficiency as resulting in the shortest grinding time to reach an intended size.

Reference Examples 1 to 18, Examples 7 to 14, and Comparative Examples 9 to 24

Cements A to G shown in Table 4 were produced from a clinker and additives by grinding them. Effects of compounds shown in Tables 5 to 11 added as a grinding aid in an amount of 0.04 parts by weight to 100 parts by weight of the clinker were evaluated. Each grinding aid was added in the form of 50% aqueous solution. Clinkers used had compositions corresponding to Cements A to G. Gypsum was added to a clinker. Each clinker was ground in the same way as in Example 1, and determined for a grinding time to reach an intended size. The resultant cement was subjected to the same compressive strength test as in Example 1 after 7 days from the production. Results are represented as relative values to a standard value (100) of a cement without a grinding aid in Tables 5 to 11.

TABLE 4

| | | Cement | | | | | | |
|---|---|---|---|---|---|---|---|---|
| | | A | B | C | D | E | F | G |
| Composition (weight %) | $C_3S$ | 47.6 | 51.0 | 63.1 | 61.4 | 49.5 | 21.0 | 63.6 |
| | $C_2S$ | 24.0 | 24.7 | 16.2 | 19.4 | 42.2 | 63.9 | 18.3 |
| | $C_3A$ | 14.6 | 12.3 | 8.6 | 7.9 | 4.5 | 1.2 | 0.4 |
| | $C_4AF$ | 8.3 | 6.9 | 8.5 | 8.8 | 0.2 | 9.6 | 11.9 |
| | Gypsum* | 5.5 | 5.1 | 3.6 | 2.5 | 3.6 | 4.3 | 5.8 |

*Gypsum contains gypsum anhydride, gypsum hemihydrate, and gypsum dihydrate.

TABLE 5

| | | grinding aid | Grinding time to reach an intended size | Compressive strength after 7 days |
|---|---|---|---|---|
| Reference example | 1 | N-methyldiethanolamine | 87 | 117 |
| | 2 | N-ethyldiethanolamine | 87 | 114 |
| | 3 | Not added (Standard) | 100 | 100 |
| | 4 | Diethanolamine | 87 | 113 |
| | 5 | Triethanolamine | 86 | 112 |
| | 6 | Triisopropanolamine | 86 | 119 |

Kind of produced cement cement A: Content of $C_3A$ is 14.6% by weight
Time of grinding of no added(standard) is 98 minutes and the compressive strength is 38.4N/mm².

TABLE 6

| | | Grinding aid | Grinding time to reach an intended size | Compressive strength after 7 days |
|---|---|---|---|---|
| Reference example | 7 | N-methyldiethanolamine | 83 | 117 |
| | 8 | N-ethyldiethanolamine | 84 | 114 |
| | 9 | Not added (Standard) | 100 | 100 |
| | 10 | Diethanolamine | 83 | 112 |
| | 11 | Triethanolamine | 82 | 114 |
| | 12 | Triisopanolamine | 83 | 117 |

Kind of produced cement Cement B: Content of $C_3A$ is 12.3% by weight.
Cement B without grinding aid (standard) exhibited a grinding time to reach an intended size of 105 minutes, and a compressive strength of 39.8N/mm2 after 7 days.

TABLE 7

| | | Grinding aid | Grinding time to reach an intended size | Compressive strength After 7 days |
|---|---|---|---|---|
| Example | 7 | N-methyldiethanolamine | 71 | 117 |
| | 8 | N-ethyldiethanolamine | 71 | 113 |
| Comparative example | 9 | Without grinding aid (standard) | 100 | 100 |
| | 10 | Diethanolamine | 73 | 111 |
| | 11 | Triethanolamine | 76 | 111 |
| | 12 | Triisopropanolamine | 74 | 118 |

Kind of produced cement cement C: content of $C_3A$ is 8.6% by weight.
Cement C without grinding aid (standard) exhibited a grinding time to reach an intended size of 143 minutes, and a compressive strength of 40.9N/mm² after 7 days.

TABLE 8

| | | Grinding aid | Grinding time to reach an intended size | Compressive strength After 7 days |
|---|---|---|---|---|
| Example | 9 | N-methyldiethanolamine | 71 | 111 |
| | 10 | N-ethyldiethanolamine | 73 | 107 |
| Comparative example | 13 | Without grinding aid (Standard) | 100 | 100 |
| | 14 | Diethanolamine | 77 | 104 |
| | 15 | Triethanolamine | 73 | 102 |
| | 16 | Triisopropanolamine | 77 | 106 |

Produced cement : Cement D containing 7.9% by weight of $C_3A$.
Cement D without grinding aid (standard) exhibited a grinding time to reach an intended size of 120 minutes, and a compressive strength of 41.7 N/mm2 after 7 days.

TABLE 9

| | | Grinding aid | Grinding time to reach an intended size | Compressive strength After 7 days |
|---|---|---|---|---|
| Example | 11 | N-methyldiethanolamine | 75 | 110 |
| | 12 | N-ehtyldiethanolamine | 73 | 108 |

TABLE 9-continued

|  |  | Grinding aid | Grinding time to reach an intended size | Compressive strength After 7 days |
|---|---|---|---|---|
| Comparative example | 17 | Not added (standard) | 100 | 100 |
|  | 18 | Diethanolamine | 80 | 100 |
|  | 19 | Triethanolamine | 80 | 100 |
|  | 20 | Triisopropanolamine | 85 | 110 |

Produced cement: Cement E containing 4.5% by weight of C3A.
Cement E without grinding aid (standard) exhibited a grinding time to reach an intended size of 135 minutes, and a compressive strength of 34.8N/mm² after 7 days.

TABLE 10

|  |  | Grinding aid | Grinding time to reach an intended size | Compressive strength after 7 days |
|---|---|---|---|---|
| Example | 13 | N-methyldiethanolamine | 70 | 110 |
|  | 14 | N-ethyldiethanolamine | 73 | 106 |
| Comparative example | 21 | No added (standard) | 100 | 100 |
|  | 22 | Diethanolamine | 76 | 103 |
|  | 23 | Triethanolamine | 76 | 115 |
|  | 24 | Triisopropanolamine | 77 | 90 |

Produced cement: Cement F containing 1.2% by weight of C3A.
Cement F without grinding aid (standard) exhibited a grinding time to reach an intended size of 140 minutes and a compressive strength of 9.51N/mm² after 7 days.

TABLE 11

|  |  | Grinding aid | Grinding time to reach an intended size | Compressive strength after 7 days |
|---|---|---|---|---|
| Reference example | 13 | N-methyldiethanolamine | 72 | 98 |
|  | 14 | N-ethyl diethanolamine | 74 | 97 |
|  | 15 | Not added (Standard) | 100 | 100 |
|  | 16 | Diethanolamine | 76 | 98 |
|  | 17 | Triethanolamine | 76 | 105 |
|  | 18 | Triisopropanolamine | 79 | 89 |

Produced cement: Cement G containing 0.4% by weight of C3A.
Cement G without grinding aid (standard) exhibited a grinding time to reach an intended size of 114 minutes, and a compressive strength of 42.1N/mm² after 7 days.

Comparison among produced cements containing different amounts of $C_3A$ shows that, in cements containing 0.5 to 9.5% by weight of $C_3A$ (Tables 7 to 10), N-methyldiethanolamine and N-ethyldiethanolamine resulted in better grinding efficiencies than other grinding aids and increased compressive strengths after 7 days. Cements in Tables 5, 6, and 11 are Reference Examples. In cements containing 0.4% by weight of $C_3A$ (Table 11), N-methyldiethanolamine and N-ethyldiethanolamine resulted in better grinding efficiencies than other grinding aids but decreased compressive strengths after 7 days from that of the standard cement. Table 12 shows organized results of grinding efficiency and compressive strength after 7 days of Cements in relation to $C_3A$ and N-methyldiethanolamine and N-ethyldiethanolamine.

TABLE 12

|  |  |  | N-methyldiethanolamine | | n-ethyldiethanolamine | |
|---|---|---|---|---|---|---|
|  |  | $C_3A$ (% by weight) | Grinding time to reach an intended size | Compressive strength after 7 days | Grinding time to reach an intended size | Compressive strength after 7 days |
| Kind of cement | A | 14.6 | 87 | 117 | 87 | 114 |
|  | B | 12.3 | 83 | 117 | 84 | 114 |
|  | C | 8.6 | 71 | 117 | 71 | 113 |
|  | D | 7.9 | 71 | 111 | 73 | 107 |
|  | E | 4.5 | 75 | 110 | 73 | 108 |
|  | F | 1.2 | 70 | 110 | 73 | 106 |
|  | G | 0.4 | 72 | 98 | 74 | 97 |

Examples 15 to 19 and Comparative Examples 25 to 29

Cement D as shown in Table 4 was produced from a clinker and additives by grinding them. Effects of compounds shown in Table 13 added as a grinding aid were evaluated. A Clinker having a composition corresponding to Cement D was used. Gypsum dihydrate was added to a clinker. Acetic acid or sulfuric acid was mixed with 50% aqueous solution of a grinding aid and added to a clinker. The clinker was ground in the same way as in Example 1, and determined for a grinding time to reach an intended size. The resultant cement was subjected to the same compressive strength test as in Example 1 after 7 days from the production. Results are represented as relative values to a standard value (100) of a cement without a grinding aid in Table 13.

TABLE 13

|  |  | Grinding aid | | | | Grinding time to reach an intended size (relative value) | Compressive strength after 7 days (corresponding value) |
|---|---|---|---|---|---|---|---|
|  |  | Kind | Dosage to 100 parts by weight of clinker (parts by weight) | Kind** | Dosage to 100 parts by weight of clinker (parts by weight) |  |  |
| Example | 15* | N-methyldiethanolamine | 0.04 | — | — | 71 | 111 |
|  | 16 | N-methyldiethanolamine | 0.04 | Acetic acid (0.8 mole) | 0.016 | 69 | 114 |
|  | 17 | N-methyldiethanolamine | 0.04 | Acetic acid (2.0 moles) | 0.040 | 69 | 113 |
|  | 18 | N-methyldiethanolamine | 0.04 | Sulfuric acid (0.8 mole) | 0.026 | 68 | 113 |
|  | 19 | N-methyldiethanolamine | 0.04 | Sulfuric acid (2.0 moles) | 0.066 | 69 | 112 |
| Comparative example | 25* | Without grinding aid (standard) | — | — | — | 100 | 100 |
|  | 26 | — | — | Acetic acid | 0.04 | 101 | 106 |
|  | 27 | — | — | Sulfuric acid | 0.04 | 100 | 104 |

TABLE 13-continued

| | | Grinding aid | | | | Grinding time | Compressive |
| | | | Dosage to 100 parts by weight of clinker | | Dosage to 100 parts by weight of clinker | to reach an intended size (relative | strength after 7 days (corresponding |
| | Kind | (parts by weight) | Kind** | (parts by weight) | value) | value) |
|---|---|---|---|---|---|---|
| 28* | Triisopropanolamine | 0.04 | — | — | 77 | 106 |
| 29 | Triisopropanolamine | 0.04 | Acetic acid (0.8 mole) | 0.010 | 77 | 105 |

Produced cement: Cement D containing 7.9% by weight of C3A.
Cement D without grinding aid (standard) exhibited a grinding time to reach an intended size of 120 minutes, and a compressive strength of 41.7 N/mm² after 7 days.
*Example 15, Comparative Example 25, and Comparative Example 28 correspond to Example 9, Comparative Example 13, and Comparative Example 16, respectively.
**The number in ( ) represents the number of moles of acetic acid or sulfuric acid to 1 mol of amine.

A combination of N-methyldiethanolamine with acetic or sulfuric acid showed enhancement in both grinding efficiency and compressive strength after 7 days, compared with a cement prepared using N-methyldiethanolamine alone. In contrast, a combination of triisopropanolamine with acetic acid showed no enhancement in grinding efficiency but reduction in compressive strength after 7 days, compared with a cement prepared using triisopropanolamine alone.

Examples 20 to 40

Cement D shown in Table 4 was produced from a clinker and additives by grinding them. Effects of compounds shown in Tables 14 to 16 added as a grinding aid were evaluated. A Clinker having a composition corresponding to Cement D was used. Gypsum dihydrate was added to a clinker. An amine and a polyol were mixed and added as a grinding aid in the form of 50% aqueous solution. The clinker was ground in the same way as in Example 1, and determined for a grinding time to reach an intended size. The resultant cement was subjected to the same compressive strength test as in Example 1 after 24 hours and 7 days from the production. Results are represented as relative values to standard values (each 100) of a cement without a grinding aid in Tables 14 to 16.

Preparation Example 1

Preparation of Glycerol-Ethylene Oxide Equimolar Adduct in an Average

In a 2 L autoclave, 230.3 g of glycerol and 1.4 g of potassium hydroxide were fed and heated to 130° C. with stirring at about 600 rpm, and dehydrated for 30 minutes at 130° C. under 1.3 kPa. Then, the mixture was heated to 155° C. To the reaction mixture was added 110.1 g of ethylene oxide (corresponding to one mole per mole of glycerol), and reacted under conditions of a temperature of 155° C. and a pressure of 0.1 to 0.3 MPa (gauge pressure). After the reaction ended, the mixture was cooled to 80° C. The glycerol-ethylene oxide equimolar adduct in an average was thus prepared.

TABLE 14

| | | Grinding aid | | | | | Time to reach an intended size [min] (corresponding value) | Compressive strength [N/mm²] (corresponding value) | |
| | | Kind of amine | Dosage to 100 parts by weight of clinker [parts by weight] | Kind of polyol | Dosage to 100 parts by weight of clinker [parts by weight] | Amine/Polyol (weight ratio) | | After 24 hours | After 7 days |
|---|---|---|---|---|---|---|---|---|---|
| Standard | | — | — | — | — | — | 120 (100) | 13.3 (100) | 41.7 (100) |
| Example | 20 | N-methyl diethanol amine | 0.02 | Diethylene glycol | 0.02 | 5/5 | 85 (71) | 14.1 (106) | 47.5 (114) |
| | 21 | N-methyl diethanol amine | 0.02 | Propylene glycol | 0.02 | 5/5 | 85 (71) | 13.9 (105) | 45.9 (110) |
| | 22 | N-methyl diethanol amine | 0.02 | Diglycerine | 0.02 | 5/5 | 86 (72) | 13.9 (105) | 47.5 (114) |
| | 23 | N-methyl diethanol amine | 0.02 | 1 mole EO adduct to glycerol | 0.02 | 5/5 | 85 (71) | 14.7 (111) | 46.0 (110) |
| | 24 | N-methyl diethanol amine | 0.02 | Glycerine | 0.02 | 5/5 | 86 (72) | 14.8 (111) | 46.0 (110) |

Polyols in Tables 13 to 15 were as follows:
diethylene glycol: Wako Pure Chemical Industries, Ltd., reagent grade (purity: 99%)
propylene glycol: Wako Pure Chemical Industries, Ltd., reagent grade
glycerol: Wako Pure Chemical Industries, Ltd., reagent grade (purity: 99%)
diglycerol: Wako Pure Chemical Industries, Ltd., reagent grade
1 mole EO adduct to glycerol: ethylene oxide (1 mole on the average) adduct to glycerol, prepared according to Preparation Example 1.

TABLE 15

| | | Grinding aid | | | | Grinding time to reach an intended size [min] (relative value) | Compressive strength [N/mm²] (relative value) | |
|---|---|---|---|---|---|---|---|---|
| | | Dosage to 100 parts by weight of cleancar | | Dosage to 100 parts by weight of cleancar | | | | |
| | Kind of amine | [parts by weight] | Kind of polyol | [parts by weight] | Amine/Polyol (weight ratio) | | After 24 hours | After 7 days |
| Standard | — | — | — | — | — | 120 (100) | 13.3 (100) | 41.7 (100) |
| Example 25 | N-methyl diethanol amine | 0.036 | 1 mole EO adduct to glycerol | 0.004 | 9/1 | 85 (71) | 13.9 (105) | 45.8 (110) |
| 26 | N-methyl diethanol amine | 0.032 | 1 mole EO adduct to glycerol | 0.008 | 8/2 | 84 (70) | 14.6 (110) | 45.8 (110) |
| 27 | N-methyl diethanol amine | 0.024 | 1 mole EO adduct to glycerol | 0.016 | 6/4 | 84 (70) | 14.7 (111) | 46.5 (112) |
| 23 | N-methyl diethanol amine | 0.02 | 1 mole EO adduct to glycerol | 0.02 | 5/5 | 85 (71) | 14.7 (111) | 46.0 (110) |
| 28 | N-methyl diethanol amine | 0.016 | 1 mole EO adduct to glycerol | 0.024 | 4/6 | 88 (73) | 14.7 (111) | 45.4 (109) |
| 29 | N-methyl diethanol amine | 0.008 | 1 mole EO adduct to glycerol | 0.032 | 2/8 | 89 (74) | 14.8 (111) | 43.9 (105) |
| 30 | N-methyl diethanol amine | 0.036 | Glycerine | 0.004 | 9/1 | 85 (71) | 13.9 (105) | 46.3 (111) |
| 31 | N-methyl diethanol amine | 0.032 | Glycerine | 0.008 | 8/2 | 85 (71) | 14.6 (110) | 45.9 (110) |
| 32 | N-methyl diethanol amine | 0.024 | Glycerine | 0.016 | 6/4 | 86 (72) | 14.6 (110) | 45.9 (110) |
| 25 | N-methyl diethanol amine | 0.02 | Glycerine | 0.02 | 5/5 | 86 (72) | 14.8 (111) | 46.0 (110) |
| 33 | N-methyl diethanol amine | 0.016 | Glycerine | 0.024 | 4/6 | 88 (73) | 14.4 (108) | 45.5 (109) |
| 34 | N-methyl diethanol amine | 0.008 | Glycerine | 0.032 | 2/8 | 94 (78) | 13.9 (105) | 43.8 (105) |

TABLE 16

| | | Grinding aid | | | | Grinding time to reach an intended size [min] (relative value) | Compressive strength [N/mm²] (relative value) | |
|---|---|---|---|---|---|---|---|---|
| | | Dosage to 100 parts by weight of clinker | | Dosage to 100 parts by weight of clinker | | | | |
| | Kind of amine | [parts by weight] | Kind of polyol | [parts by weight] | Amine/Polyol (weight ratio) | | After 24 hours | After 7 days |
| Standard | — | — | — | — | — | 120 (100) | 13.3 (100) | 41.7 (100) |
| Example 35 | N-methyl siethanol amine | 0.005 | 1 mole EO adduct to glycerol | 0.005 | 5/5 | 98 (82) | 13.6 (102) | 43.3 (103) |
| 36 | N-methyl diethanol amine | 0.01 | 1 mole EO adduct to glycerol | 0.01 | 5/5 | 88 (73) | 14.3 (108) | 45.9 (110) |
| 23 | N-methyl diethanol amine | 0.02 | 1 mole EO adduct to glycerol | 0.02 | 5/5 | 85 (71) | 14.7 (111) | 46.0 (110) |
| 37 | N-methyl diethanol amine | 0.03 | 1 mole EO adduct to glycerol | 0.03 | 5/5 | 84 (70) | 14.8 (111) | 47.2 (113) |

TABLE 16-continued

| | | Grinding aid | | | | Grinding | | |
|---|---|---|---|---|---|---|---|---|
| | | | Dosage to 100 parts by weight of clinker | | Dosage to 100 parts by weight of clinker | | time to reach an intended size [min] | Compressive strength [N/mm²] (relative value) | |
| | Kind of amine | [parts by weight] | Kind of polyol | [parts by weight] | Amine/Polyol (weight ratio) | (relative value) | After 24 hours | After 7 days |
| 38 | N-methyl diethanol amine | 0.005 | Glycerine | 0.005 | 5/5 | 100 (83) | 13.6 (102) | 43.3 (103) |
| 39 | N-methyl diethanol amine | 0.01 | Glycerine | 0.01 | 5/5 | 90 (74) | 14.4 (108) | 45.8 (109) |
| 24 | N-methyl diethanol amine | 0.02 | Glycerine | 0.02 | 5/5 | 86 (72) | 14.8 (111) | 46.0 (110) |
| 40 | N-methyl diethanol amine | 0.03 | Glycerine | 0.03 | 5/5 | 86 (71) | 14.9 (112) | 47.0 (112) |

In Tables 14 to 16, all values in parentheses in columns of the grinding time and the compressive strength represent relative values to those of a standard without a grinding aid as a standard value (100). A combination of N-methyldiethanolamine with a polyol having 3 to 8 carbon atom showed significant enhancement in both grinding efficiency and compressive strength.

Examples 41 to 48

Cement E as shown in Table 4 was produced from a clinker and additives by grinding them. Effects of monoacetin and N-methyldiethanolamine as a grinding aid were evaluated. A Clinker having a composition corresponding to Cement E was used. Gypsum dihydrate was added to a clinker as an additional material. Monoacetin and N-methyldiethanolamine were mixed and added as a grinding aid in the form of 50% aqueous solution. The clinker was ground in the same way as in Example 1, and determined for a grinding time to reach an intended size. The resultant cement was subjected to the same compressive strength test as in Example 1 after 24 hours and 7 days from the production. Results are represented as relative values to standard values (each 100) of a cement without a grinding aid in Table 17.

As shown in Table 17, a combination of glycerol monoacetate and N-methyldiethanolamine resulted in significant enhancement in both 24-hour and 7-day compressive strengths. In Table 17, all values represent relative values to those of a standard without a grinding aid as a standard value (100).

Example 49

A clinker corresponding to Cement C as shown in Table 4 was ground using a combination of glycerol monoacetate and N-methyldiethanolamine, and determined for a grinding time to reach an intended size. The resultant cement was subjected to the same compressive strength test after 24 hours and 7 days from the production. Results are shown in Table 18.

TABLE 17

| | | Grinding aid | | | | Compressive strength (relative value) | |
|---|---|---|---|---|---|---|---|
| | | Dosage to 100 parts by weight of clinker (parts by weight) | | Dosage to 100 parts by weight of clinker (parts by weight) | Grinding time to reach an intended size (relative value) | | |
| | Kind | | Kind | | | After 24 hours | After 7 days |
| Standard | — | — | — | — | 100 | 100 | 100 |
| Example 41 | Monoacetin | 0.008 | M-DEA | 0.032 | 75 | 115 | 115 |
| 42 | Monoacetin | 0.012 | M-DEA | 0.028 | 70 | 120 | 120 |
| 43 | Monoacetin | 0.016 | M-DEA | 0.024 | 70 | 120 | 115 |
| 44 | Monoacetin | 0.02 | M-DEA | 0.02 | 65 | 125 | 115 |
| 45 | Monoacetin | 0.028 | M-DEA | 0.012 | 70 | 120 | 115 |
| 46 | Monoacetin | 0.032 | M-DEA | 0.008 | 75 | 115 | 110 |
| 47 | Monoacetin | 0.01 | M-DEA | 0.01 | 75 | 115 | 110 |
| 48 | Monoacetin | 0.04 | M-DEA | 0.04 | 75 | 125 | 115 | monoacetin: glycerol monoacetate (Wako Pure Chemical Industries, Ltd., reagent grade)

TABLE 18

| | Grinding aid | | | | | |
| | Dosage to 100 parts by weight of clinker (parts by weight) | | Dosage to 100 parts by weight of clinker (parts by weight) | Grinding time to reach an intended size | Compressive strength (relative value) | |
| | Kind | weight) | Kind | weight) | (relative value) | After 24 hours | After 7 days |
|---|---|---|---|---|---|---|---|
| Standard | — | — | — | — | 100 | 100 | 100 |
| Example 49 | Monoacetin | 0.02 | M-DEA | 0.02 | 68 | 130 | 121 |

The invention claimed is:

1. A method for producing a hydraulic powder comprising $C_3A$ in an amount of 0.5 to 9.5% by weight, comprising a step of grinding a hydraulic compound in the presence of an alkanolamine having a freezing point of not higher than 0° C.

2. The method for producing a hydraulic powder according to claim 1, wherein the alkanolamine has a freezing point of not lower than −100° C.

3. The method for producing a hydraulic powder according to claim 1, wherein the alkanolamine is an alkyldiethanolamine having a linear alkyl group having 1 to 4 carbon atoms.

4. The method for producing a hydraulic powder according to claim 1, wherein the alkanolamine is N-methyldiethanolamine.

5. The method for producing a hydraulic powder according to claim 1, wherein the amount of the alkanolamine is 0.001 to 0.2 parts by weight to 100 parts by weight of the hydraulic compound.

6. The method for producing a hydraulic powder according to claim 1, wherein the alkanolamine is present in the form of an aqueous solution and the amount of water of the aqueous solution is 0.001 to 0.1 part by weight to 100 parts by weight of the hydraulic compound.

7. The method for producing a hydraulic powder according to claim 1, wherein the hydraulic powder contains $C_4AF$ in an amount of not more than 11% by weight.

8. The method for producing a hydraulic powder according to claim 1, further using an acid.

9. The method for producing a hydraulic powder according to claim 3, further using a polyol having 3 to 8 carbon atoms.

10. The method for producing a hydraulic powder according to claim 9, wherein the polyol is one or more compounds selected from the group consisting of diethylene glycol, glycerol, diglycerol, and glycerol-ethylene oxide adducts.

11. The method for producing a hydraulic powder according to claim 3, further using glycerol monoacetate.

12. A method of grinding a hydraulic compound with an alkanolamine having a freezing point of not higher than 0° C. to manufacture a hydraulic powder comprising $C_3A$ in an amount of 0.5 to 9.5% by weight.

13. The method according to claim 12, wherein the alkanolamine has a freezing point of not lower than −100° C.

14. The method according to claim 12, wherein the alkanolamine is an alkyldiethanolamine having a linear alkyl group having 1 to 4 carbon atoms.

15. The method according to claim 12, wherein the alkanolamine is N-methyldiethanolamine.

16. The method according to claim 12, wherein an acid is further used.

17. The method according to claim 15, wherein a polyol having 3 to 8 carbon atoms is further used.

18. The method according to claim 17, wherein the polyol is one or more compounds selected from the group consisting of diethylene glycol, glycerol, diglycerol, and glycerol-ethylene oxide adducts.

19. The method according to claim 15, wherein glycerol monoacetate is further used.

20. A hydraulic powder comprising $C_3A$ in an amount of 0.5 to 9.5% by weight, obtained by the method according to claim 1.

* * * * *

UNITED STATES PATENT AND TRADEMARK OFFICE
CERTIFICATE OF CORRECTION

PATENT NO. : 8,506,701 B2  
APPLICATION NO. : 13/810216  
DATED : August 13, 2013  
INVENTOR(S) : Keiichiro Sagawa et al.

Page 1 of 1

It is certified that error appears in the above-identified patent and that said Letters Patent is hereby corrected as shown below:

IN THE SPECIFICATION:

In Table 3, at columns 16 and 17, in each of Examples 6-1 through 6-6 under the "Kind" column for the "grinding aid", change "N-ethyldiethanolamine" to --N-methyldiethanolamine--.

Signed and Sealed this  
Eleventh Day of August, 2015

Michelle K. Lee  
*Director of the United States Patent and Trademark Office*